US009282281B2

(12) United States Patent
Williams et al.

(10) Patent No.: US 9,282,281 B2
(45) Date of Patent: Mar. 8, 2016

(54) CABLE MODEM WITH DUAL AUTOMATIC ATTENUATION

(75) Inventors: Chris Williams, Nepean (CA); Roland Smith, Nepean (CA); Jarek Zaniewski, Nepean (CA); Marcel Chenier, Gatineau (CA); Stephen Rayment, Ottawa (CA)

(73) Assignee: ERICSSON WIFI INC., Plano, TX (US)

( * ) Notice: Subject to any disclaimer, the term of this patent is extended or adjusted under 35 U.S.C. 154(b) by 280 days.

(21) Appl. No.: 12/978,684

(22) Filed: Dec. 27, 2010

(65) Prior Publication Data

US 2012/0163201 A1 Jun. 28, 2012

(51) Int. Cl.
H04L 12/26 (2006.01)
H04L 12/28 (2006.01)
H04N 7/10 (2006.01)

(52) U.S. Cl.
CPC ............... *H04N 7/102* (2013.01); *H04L 12/26* (2013.01); *H04L 12/2801* (2013.01)

(58) Field of Classification Search
None
See application file for complete search history.

(56) References Cited

U.S. PATENT DOCUMENTS

| 3,989,333 | A | | 11/1976 | Cauldwell | |
|---|---|---|---|---|---|
| 4,691,976 | A | | 9/1987 | Cowen | |
| 5,267,071 | A | * | 11/1993 | Little et al. | 398/162 |
| 5,596,361 | A | * | 1/1997 | Martinez | 725/123 |
| 6,877,166 | B1 | * | 4/2005 | Roeck et al. | 725/111 |
| 7,742,777 | B2 | | 6/2010 | Strater et al. | |
| 2002/0011897 | A1 | * | 1/2002 | Gibson et al. | 330/51 |
| 2002/0056134 | A1 | * | 5/2002 | Abe et al. | 725/120 |
| 2003/0192055 | A1 | * | 10/2003 | Aoki et al. | 725/109 |
| 2004/0255332 | A1 | * | 12/2004 | Bertonis et al. | 725/123 |
| 2005/0097617 | A1 | * | 5/2005 | Currivan et al. | 725/111 |
| 2005/0155082 | A1 | * | 7/2005 | Weinstein et al. | 725/131 |
| 2006/0148406 | A1 | * | 7/2006 | Strater et al. | 455/63.1 |
| 2007/0072555 | A1 | | 3/2007 | Reese et al. | |
| 2008/0168518 | A1 | * | 7/2008 | Hsue et al. | 725/125 |
| 2008/0313694 | A1 | * | 12/2008 | Kudo et al. | 725/131 |
| 2009/0007210 | A1 | * | 1/2009 | Nishide et al. | 725/125 |
| 2009/0143036 | A1 | * | 6/2009 | McCarthy et al. | 455/249.1 |
| 2010/0100919 | A1 | | 4/2010 | Hsue et al. | |

OTHER PUBLICATIONS

Written Opinion of the International Searching Authority for International Application No. PCT/CA2011/050792 with a date of completion of Mar. 12, 2012.
International Search Report for International Application No. PCT/CA2011/050792 with a mailing date of Mar. 13, 2012.
DOCSIS® Specifications—DOCSIS® 3.0 Interface (http://www.cablelabs.com/cablemodem/specifications/specifications30.html—Accessed Dec. 23, 2010).
Apr. 14, 2014 Extended European Search Report for European Patent Application No. 11 85 2553.

* cited by examiner

*Primary Examiner* — Kodzovi Acolatse
(74) *Attorney, Agent, or Firm* — Katten Muchin Rosenman LLP

(57) ABSTRACT

Described herein are a number of steps, methods and/or solutions that can be applied to greatly improve attenuation control of RF signals in cable plant. The present disclosure is directed to a cable modem auto-attenuation system or any other signal transferring system. The system may be capable of taking a high-power signal from the cable plant's service line, dropping the power value down to a usable level and transmitting the signal to a cable modem while eliminating the need for rigorous manual adjustments that a normal cable modem often requires. In certain embodiments, the system may be integrated into a separate device connected between the modem and the cable company service line and configured to handle upstream and downstream attenuation separately or jointly.

26 Claims, 12 Drawing Sheets

CABLE MODEM WITH DUAL AUTOMATIC ATTENUATION

TECHNICAL FIELD

The present disclosure relates to wireless communication systems and attenuation management. More specifically, the present invention relates to enhancements protocols and algorithms for automatic control of cable modem attenuation.

BACKGROUND

As technology progresses and electronic devices become more advanced, one issue that continues to plague system designers is the inevitable signal loss over a span of cable—this power loss is referred to as attenuation. Attenuation is a key specification for all cables (e.g., coaxial cable, a type of cable that supplies a signal to a cable modem) and affects the propagation of signals in upstream and downstream electrical circuits. This is a considerable issue in the cable and telecom industries, which run thousands of miles of cable to provide services to their users. The basic function of a coax cable is to act as a pipe, transferring RF (radio frequency) signals from a signal source to a receiver (e.g., from the cable plant to the end-user). In a perfect world, the amount of power exiting the coax cable should be equal to the amount that entered it. In the real world, however, this is not the case, and some power is lost along the length of the RF cable, causing less power to reach the user than originally entered the RF cable. Cable and telecom companies typically use a number of tactics to manage this problem. These tactics may include placing amplifiers along the line and using lower-loss cable. It is well known that attenuation varies depending on the type of cable and is usually directly correlated to the length of a specific cable. Unfortunately, because lower-loss cable is typically more expensive, cable and telecom companies are reluctant to use it. Table 1 provides an overview and compares the various coax-cable signal losses.

There are a number of causes for the above-described power loss. A first cause of power loss is radiated loss. Radiated loss is generally the least important cause because only a miniscule amount of power is generally radiated from most cables. Nevertheless, very inexpensive coax cables may have a very poor outer braid, and in this case, radiated loss may represent a noticeable element of the loss. As discussed in the following paragraphs, most loss can be attributed to the resistive and dielectric losses within the coax cable.

A second cause of loss is resistive loss within the coax cable. Resistive loss arises from the basic resistance of the conductors (e.g., the copper wire within the cable)—the current flowing in the conductors results in heat being dissipated. The actual area through which the current flows in the conductor is limited by the skin effect, which becomes progressively more apparent as the frequency rises. To decrease the power loss due to resistance, multi-stranded conductors can be used, as they have a lower resistance than solid conductors. To reduce the level of power loss in the coax cable, the conductive area must be increased, resulting in lower-loss coax cables being larger (and heavier) than higher loss cables. The resistive losses may also increase as the square root of the frequency, meaning that resistive losses normally dominate at lower frequencies.

A third cause of loss is dielectric loss. The dielectric loss represents a major loss in most coax cables. As with resistive losses, the power lost as dielectric loss is dissipated as heat. The dielectric loss is typically independent of the size of the RF cable, but increases linearly with frequency. Therefore, where resistive losses increase as the square root of the frequency, dielectric losses increase linearly, causing the dielectric losses to dominate at higher frequencies.

To combat such power loss, cable and/or telecom companies typically install power amplifiers, spaced throughout the cable network (the "cable plant"). Such amplifiers are adjusted when the cable plant is installed, and again every time an additional tap is installed or removed from that cable

TABLE 1

Approximate Coax Cable Signal Loss (Attenuation) in dB per 100 ft

|  | RG-174 | RG-58 | RG-8X | RG-213 | RG-6 | RG-11 | RF-9914 | RF-9913 |
| --- | --- | --- | --- | --- | --- | --- | --- | --- |
| 1 MHz | 1.9 dB | 0.4 dB | 0.5 dB | 0.2 dB | 0.2 dB | 0.2 dB | 0.3 dB | 0.2 dB |
| 10 MHz | 3.3 dB | 1.4 dB | 1.0 dB | 0.6 dB | 0.6 dB | 0.4 dB | 0.5 dB | 0.4 dB |
| 50 MHz | 6.6 dB | 3.3 dB | 2.5 dB | 1.6 dB | 1.4 dB | 1.0 dB | 1.1 dB | 0.9 dB |
| 100 MHz | 8.9 dB | 4.9 dB | 3.6 dB | 2.2 dB | 2.0 dB | 1.6 dB | 1.5 dB | 1.4 dB |
| 200 MHz | 11.9 dB | 7.3 dB | 5.4 dB | 3.3 dB | 2.8 dB | 2.3 dB | 2.0 dB | 1.8 dB |
| 400 MHz | 17.3 dB | 11.2 dB | 7.9 dB | 4.8 dB | 4.3 dB | 3.5 dB | 2.9 dB | 2.6 dB |
| 700 MHz | 26.0 dB | 16.9 dB | 11.0 dB | 6.6 dB | 5.6 dB | 4.7 dB | 3.8 dB | 3.6 dB |
| 900 MHz | 27.9 dB | 20.1 dB | 12.6 dB | 7.7 dB | 6.0 dB | 5.4 dB | 4.9 dB | 4.2 dB |
| 1 GHz | 32.0 dB | 21.5 dB | 13.5 dB | 8.3 dB | 6.1 dB | 5.6 dB | 5.3 dB | 4.5 dB |
| Impedance (Z) | 50 Ω | 50 Ω | 50 Ω | 50 Ω | 75 Ω | 75 Ω | 50 Ω | 50 Ω |

Attenuation is defined in terms of decibels per unit length at a given frequency (the longer the cable, the greater the loss) where the loss is also frequency-dependent, typically increasing with frequency. Other factors, however, may also impact a cable's attenuation value. For example, at frequencies of 1 GHz, an RF cable normally exhibiting a loss of 10 dB may experience a loss increase of 1 dB or more when physically bent. Other factors, including the temperature and weather, can also have an impact on the loss. In general, 75Ω coax cable is used almost exclusively for TV and VHF FM applications. But for commercial, amateur and CB applications, 50Ω coax cable has been adopted as the standard.

plant. Furthermore, the cable installers typically over-power each cable strand (a "hot" cable), somewhat, to ensure sufficient signal strength at each tap. At each tap, the power is usually attenuated to proper levels to avoid damaging downstream circuitry. This attenuation is accomplished by either installing a physical attenuator at each tap and/or coiling extra lengths of cable until the correct power level is achieved. This strategy is problematic because the attenuators must be changed and/or the cable re-coiled every time power changes are propagated through the cable plant.

Currently, the cable companies set the downstream levels using a tap box. The tap box, which may or may not be power-amplified, is usually located at the service line (e.g., the distribution line carrying a signal from a cable plant) in the street or alley and provides a connection to individual users. The tap box acts essentially as a "T-connection" where the service line carrying the high power signal (e.g., ~20 to 52 dBmV) from the cable plant may proceed to the next house while the power of the signal being diverted to each user is dropped until a desired target downstream level is reached. This type of tap box is well known in the industry and typically sets only the downstream power, tapping out a small portion of the power and feeding it to the user. See, for example, U.S. Pat. No. 3,989,333 to Jack Cauldwell and U.S. Pat. No. 4,691,976 to Judith A. Cowen. Cauldwell and Cowen both teach cable tap connectors which divert a signal from a cable service line to the user without disrupting the service line's flow to the next user. In some instances, cable companies may insert a physical attenuator plugs into a tap box.

Because the RF signal usually travels through a great distance of cable (e.g., 150-200 feet) from the service line to the user, where standard RF cable can yield more loss at high frequency than at low frequency, there may be much downstream attenuation but very little upstream attenuation. The present disclosure is designed to take this large disproportion between downstream and upstream attenuation into account. For example, the upstream may have a low frequency range of about 5 to 100 MHz while the downstream may range from about 100 up to about 800 MHz. Currently, at least in the United States, typical DOCSIS modems are capable of transmitting upstream signals in the frequency band of about 5 to 54 MHz (however, this range may be expanded upwards), while capable of receiving cable channels or data channels in the range of about 88 to 750MHz.

Therefore, what is needed is an effective strategy to deal with cable power fluctuations at the tap, which avoids the necessity of service visits by cable/telecom workers.

In addition to the above, it is important to note that cable modem chips, such as those made by Texas Instruments or Broadcom, are designed to be optimized specifically for the above defined installations. Cable companies work closely with chip manufactures to define the operating ranges of these devices that attach directly to the cable plant, and as such, must meet strict requirements for out-of-band noise and in-band noise. These specifications are detailed in "Data Over Cable System Interface Specification" by CableLabs and cover the PHY(sical), MAC (Media Access Control), DLC (Data Link Control), Networking protocol layers and other aspects of the cable modem operation on the plant. It is sufficient to state that the specifications have been optimized to address the operational requirements of the hundreds of millions of cable modems which are installed and operate throughout the world.

These cable modems have been optimized to address the operational requirements of the home user, and as previously discussed, those requirements address locations where most cable modems are located behind a significant amount of downstream attenuation due to the 150-200 feet of high-loss cable connecting the plant to each home.

However, for equipment located directly on the plant, both the levels and the actual operational requirements are different from those of the millions of home cable modems. More specifically, and in addition to the downstream levels being higher, the cable modems installed directly attached to the plant must accept very high (typically as high as +35 dBmV, but possibly as high as +45 dBmV) input signals. Such high levels require significant downstream attenuation, which has been described above. However, not yet described, is that these cable modems are required to inject minimal levels of spurious emissions into the plant. All cable modems employ output level control, which is defined in the DOCSIS (Date Over Cable System Interface) Specification to be +8 dBmV to +54 dBmV (some devices may be slightly higher or lower). Such a wide range in output level is achieved by a DAC (Digital to Analog Converter), usually a 14 bit DAC, in the cable modem which performs level adjustment to the upstream signal. The CMTS (Cable Modem Termination System), located in the cable operators' facilities, controls the output level of the cable modem, and will adjust the cable modem upstream level to arrive at an acceptable input level.

Most home-installed cable modems have a significant amount of downstream attenuation due to the 150-200 foot cable run, and as a result, the CMTS does not need to adjust the upstream level to be very low. For example, if 200 feet of RG58 is installed, then the downstream will have been attenuated by at least 10 dBi once connector losses are included. This means that the CMTS will set the upstream signal level to be a value—for example +35 dBmV—so that the upstream signal falls within the desired range at the CMTS. However, if the same cable modem is installed directly connected to the plant, then the downstream will be 10 dB higher, and when adjusted with a fixed attenuator as is often the case, the CMTS will set the upstream level to be 10 dB lower, or in this case, +25 dBmV which is within the operational range of the cable modem.

Plant engineers, the technical team that manages the levels on the core infrastructure of the plant, have important rules regarding what levels are allowed and not allowed. They have learned that cable modems should never transmit at low levels, since their inherent signal-to-noise (SNR) levels are higher when they transmit at +8 dBmV rather than at +48 dBmV. This is understandable, since SNR is a function of the number of bits in the DAC and with each bit providing 6 dB of gain, the +8 dBmV signal will have 5 bits employed for signal level shifting, reducing the SNR. Plant engineers require a minimum level between +45 dBmV and +52 dBmV, maximizing the cable modem DAC level and minimizing the noise injected onto the plant. They rely on separation of external filters—employing fixed downstream filters and fixed upstream specific filters to attempt to achieve the desired levels. The static attenuation filters are installed and do not change, thus allowing the CMTS to automatically adjust the upstream levels to achieve the desired range.

This invention, "CABLE MODEM WITH DUAL AUTOMATIC ATTENUATION," provides control algorithms that enable the cable modem to operate with maximum SNR while addressing the concurrent level adjustments of the CMTS. This invention automatically adjusts the downstream and upstream attenuation levels independently, and in the presence of automatics adjustments from the CMTS to control the upstream levels. The present application achieves optimal downstream levels, so that the BER is minimized, and concurrently adjusts the upstream levels to enable the cable modem to operate at maximum SNR, while ensuring that the absolute levels of the cable modem are within the defined tolerances defined, not by the CableLabs DOCSIS standards, but by the experience of the Plant Engineers.

SUMMARY OF THE INVENTION

The present disclosure is directed to a cable modem Auto-Attenuation System and other Auto-Attenuation Systems.

The present application aims to reduce or eliminate the above-described unnecessary costs by implementing an algorithm at or near the cable modem to dynamically sense the downstream receiving signal strength and adjusting the attenuation on both the upstream and the downstream links until a desired target signal strength is reached.

To avoid the high loss (typically in 150 to 200 feet of RF cable), the present embodiments are preferably designed to be directly connected to the cable service line and capable of automatically and/or manually attenuating the signal delivered to the cable modem installed, for example, in a strand-mounted device (e.g., a BelAir100S Strand-Mounted Wireless Access Point). The attenuation structure and function may be located inside the cable modem in a device installed between the cable and the modem, or some combination of the two. If installed in the modem, the attenuation can often be performed by software running on one or more of the microprocessors/signal-processors/DSPs/ASICS/etc., already present in the modem. Similar structure/software can be used if the attenuation is performed by one or more devices located outside the modem. Preferably, the attenuation is performed inside the modem, for example in the BelAir100S.

According to a first aspect of the present invention, a device for automatically attenuating an upstream modem signal comprises a duplexer for splitting upstream signals and downstream signals; an upstream attenuator capable of attenuating upstream signals; and a control processors running software which is configured to (i) sense the upstream signal level and (ii) adjust the upstream attenuator until the desired target signal strength is reached.

According to a second aspect of the present invention, a device for automatically attenuating a downstream modem signal from a CMTS comprises a duplexer for splitting upstream signals and downstream signals; a downstream attenuator capable of attenuating downstream signals; and a controller capable of monitoring receive error rate (BER or CER) information from the received downstream signal, and containing one or more processors running software which is configured to (i) sense the downstream signal level, (ii) adjust the downstream attenuator until the desired target signal strength is reached.

According to a third aspect of the present invention, a device for automatically attenuating both downstream and upstream modem signals comprises a duplexer for splitting upstream signals and downstream signals; a downstream attenuator capable of attenuating downstream signals; an upstream attenuator, capable of attenuating upstream signals; and a controller capable of monitoring receive error rate (BER or CER) information from the received downstream signal, and containing one or more processors running software which is configured to: (i) sense the upstream signal level; (ii) adjust the upstream attenuator until the desired target signal strength is reached; (iii) sense the downstream signal level; and (iv) adjust the downstream attenuator until the desired target signal strength is reached.

According to a fourth aspect of the present invention, a device for automatically attenuating both downstream and upstream modem signals comprises a duplexer for splitting upstream signals and downstream signals; a combined upstream/downstream attenuator capable of attenuating both downstream and upstream signals; an upstream attenuator, capable of attenuating upstream signals; and a controller capable of monitoring receive error rate (BER or CER) information from the received downstream signal, and containing one or more processors running software which is configured to: (i) sense the upstream signal level; (ii) adjust the upstream attenuator until the desired target signal strength is reached; (iii) sense the downstream signal level; and (iv) adjust the downstream attenuator until the desired target signal strength is reached.

According to a fifth aspect of the present invention, a device for automatically attenuating both downstream and upstream modem signals comprises a duplexer for splitting upstream signals and downstream signals; a combined upstream/downstream attenuator, capable of attenuating both downstream and upstream signals; a downstream attenuator, capable of attenuating upstream signals; and controller capable of monitoring receive error rate (BER or CER) information from the received downstream signal, and containing one or more processors running software which is configured to: (i) sense the upstream signal level; (ii) adjust the upstream attenuator until the desired target signal strength is reached; (iii) sense the downstream signal level; and (iv) adjust the downstream attenuator until the desired target signal strength is reached.

According to a sixth aspect of the present invention, a device for automatically attenuating both downstream and upstream modem signals comprises a duplexer for splitting upstream signals and downstream signals; a combined upstream/downstream attenuator, capable of attenuating both downstream and upstream signals; an upstream attenuator, capable of attenuating upstream signals; and a controller capable of monitoring receive error rate (BER or CER) information from the received downstream signal, and containing one or more processors running software which is configured to: (i) sense the upstream signal level; (ii) adjust the upstream attenuator until the desired target signal strength is reached; (iii) sense the downstream signal level; and (iv) adjust the downstream attenuator until the desired target signal strength is reached, wherein the upstream or downstream signals may consist of a plurality of frequency separate signals.

In certain embodiments, the controller of the preceding embodiments may be a cable broadband controller and/or connected to the cable plant through a cable interface. Furthermore, the upstream and/or downstream signals may consist of a plurality of frequency separate signals.

According to a seventh aspect of the present invention, a cable modem capable of automatically attenuating upstream and downstream modem signals is taught. The cable modem may comprise a duplexer for splitting a signal into upstream signals and downstream signals; an upstream attenuator capable of attenuating upstream signals; a downstream attenuator capable of attenuating downstream signals; and one or more processors running software which is configured to sense downstream signal strength and adjust the upstream attenuator and the downstream attenuator until a desired target signal strength is reached.

In certain embodiments, the signal may be supplied either to the modem over a cable or wirelessly. In yet another embodiment, the one or more processors that run software may be configured to adjust the upstream attenuator and the downstream attenuator independently or simultaneously.

According to an eight aspect of the present invention, a method for automatically attenuating at least one signal is taught. This method comprising the steps of: (i) sensing a downstream signal strength; and (ii) adjusting upstream attenuation and downstream attenuation until a desired target signal strength is reached.

DESCRIPTION OF THE DRAWINGS

These and other advantages of the present invention will be readily understood with reference to the following specifications and attached drawings wherein.

DETAILED DESCRIPTION

Preferred embodiments of the present invention will be described hereinbelow with reference to the accompanying drawings. In the following description, well-known functions or constructions are not described in detail because they would obscure the invention in unnecessary detail.

Described herein are a number of steps, methods, and solutions which may be applied to greatly improve attenuation control of cable-propagating RF signals. The preferred embodiment is directed to a DOCSIS cable modem Auto-Attenuation System (the "Auto-Attenuation System"), but may be applied to any signal transferring system. The Auto-Attenuation System may be capable of taking a high-power signal from the cable plant's service line, dropping the power value down to a usable level, and providing the signal to a cable modem (CM) while eliminating the need for rigorous specifications that a normal cable modem often requires. In certain embodiments, an Auto-Attenuation System may be integrated into a separate device connected (wired or wirelessly) between the modem and the cable company service line and configured to handle upstream (US) and downstream (DS) attenuation separately or jointly. Alternatively, the Auto-Attenuation System may be integrated with a cable modem itself. In fact, depending on the application or designer's preference, the Auto-Attenuation System may also be integrated with the functionality of a tap box. In a typical cable system, upstream and downstream signals may be carried on a single coaxial cable split off from the service line at a box, commonly referred to as a tap box. Because a tap box may have a certain insertion loss (e.g., 1 to 1.5 dB), cable companies often install the tap directly on the service line.

Figure 1:
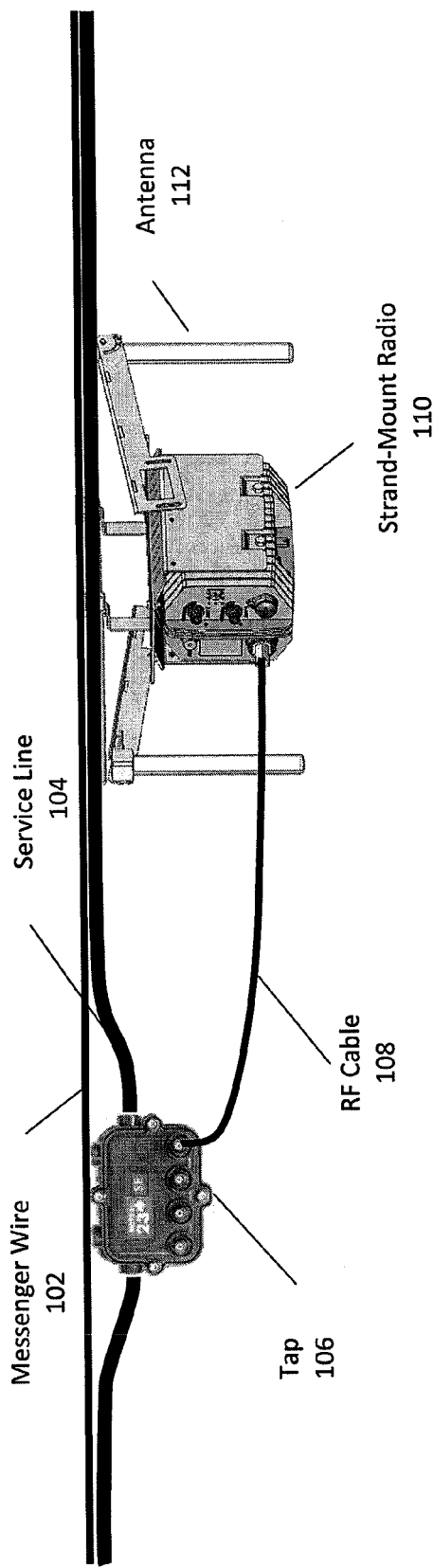
FIG. 1 is a high-level diagram illustrating a service line equipped to enable the Auto-Attenuation System.

Referring to FIG. 1, an example cable of a modem Auto-Attenuation System is depicted using a strand-mount radio 110 (e.g., the BelAir100S, described above). A messenger wire 102 is typically strung between posts and/or structural supports to provide structural integrity to the system while simultaneously providing a ground source. A service line 104 for carrying the high-power signal from the cable plant is strung substantially parallel to the messenger wire 102 and may be connected and/or tied to the messenger wire 102 at certain intervals. To minimize signal loss, the service line 104 may further include amplifiers at certain intervals (e.g., every mile). These amplifiers may be bidirectional amplifiers having the downstream and the upstream diplexed, allowing for independent amplification of each signal. The primary role of the service line 104 is to deliver the high-power signal from the cable plant to various users or neighborhoods. For example, when a user requests cable service, a tap box 106 is used to divert the signal to the user's residence. In previous systems, a 150-200 foot cable was merely strung from the tap box 106 to the user's residence. But, rather than using an unnecessary length of wire to communicate the signal from the tap box 106 to the user, the Auto-Attenuation System uses only a short RF cable 108 (e.g., 1 to 4 feet) to carry the signal from the tap box 106 to the strand-mount radio 110. The strand-mount radio 110 is typically mounted on the messenger wire 102 and wirelessly communicates the signal to the user's residence while avoiding any potential loss in the 150-200 foot cables currently used. In certain embodiments, amplifiers may be integrated with the tap box or with the Auto-Attenuation System device.

Figure 2:
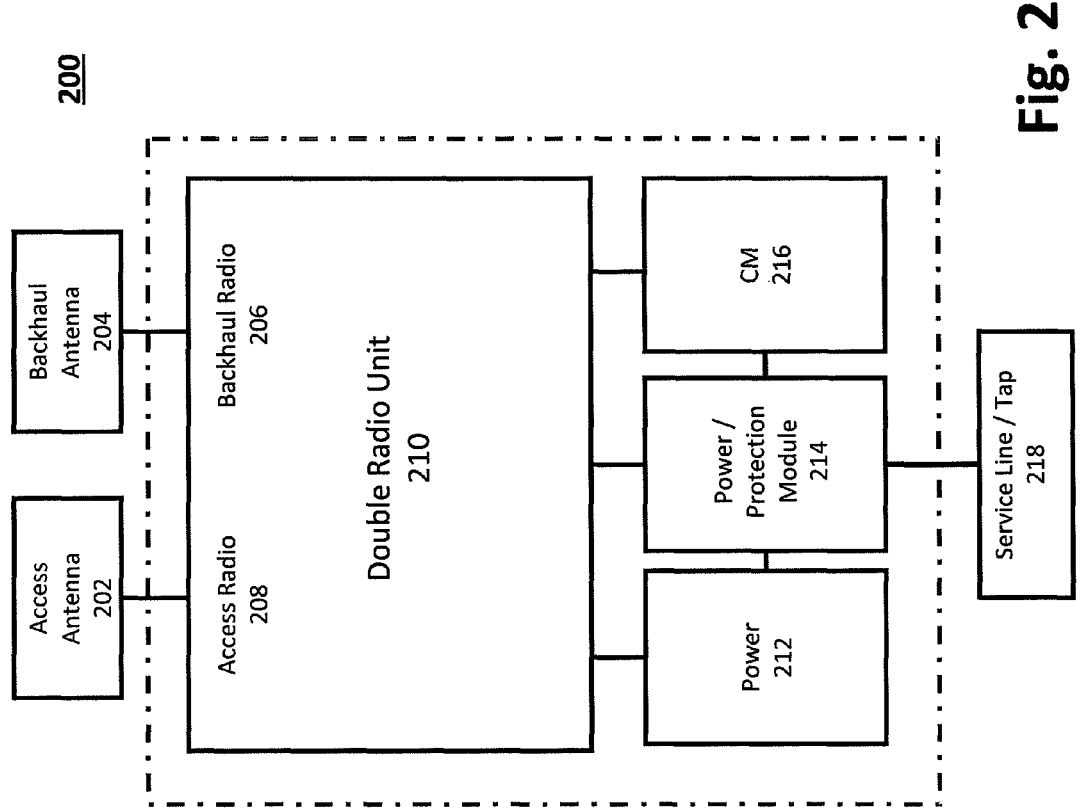
FIG. 2 is a block diagram illustrating a strand-mount radio.

FIG. 2 is a block diagram of an example strand-mount radio 200, as shown at 110 in FIG. 1. The strand-mount radio 200 may be capable of receiving a high-power RF signal from a service line and/or tap 218, and wirelessly communicating an RF signal via an access antenna 202 and/or a backhaul antenna 204. The strand-mount radio 200 may include a double radio unit 210 having an access radio 208 and/or a backhaul radio 206, coupled to the access antenna 202 and the backhaul antenna 204. The strand-mount radio 200 may also include a power supply 212 (e.g., a 40-87VAC to 5VDC Power Supply), a power and protection module 214, and cable modem 216 (e.g., a DOCSIS cable modem).

Referring now to FIG. 3, a block diagram of preferred cable modem architecture 300 equipped to operate the Auto-Attenuation System is shown. The RF signal from the service line is provided to an input 302, which provides the signal to a diplexor 304, which diplexes the incoming RF signal into transmit (upstream) and receive (downstream) signal paths. The downstream signal then progresses to a digital DS attenuator 308, which adjusts the signal to a desired range before sending it to a tuner 312 (e.g., a cable tuner). From the tuner 312, the downstream signal reaches a control processor 314 (e.g., a signal ASIC with central processor, medium address controller, and physical layer functions, plus typical A/D and I/O structures). The control processor 314 may also be in communication with SDRAM 316 and/or ROM 318 for short- and long-term memory/data storage. The downstream signal may be communicated to peripheral devices via an Ethernet connection 328 using an Ethernet physical layer 326 and/or a USB or other function 324 provided by the control processor 314. Upstream signals may also be communicated from peripheral devices via an Ethernet connection 328 using the Ethernet physical layer 326 and/or the USB or other function 324, to the control processor 314. The control processor 314 may communicate the upstream signal to a filter 310 and a digital upstream attenuator 306. The digital upstream attenuator 306 adjusts the signal to a desired range before returning to the diplexor 304.

Figure 3A:
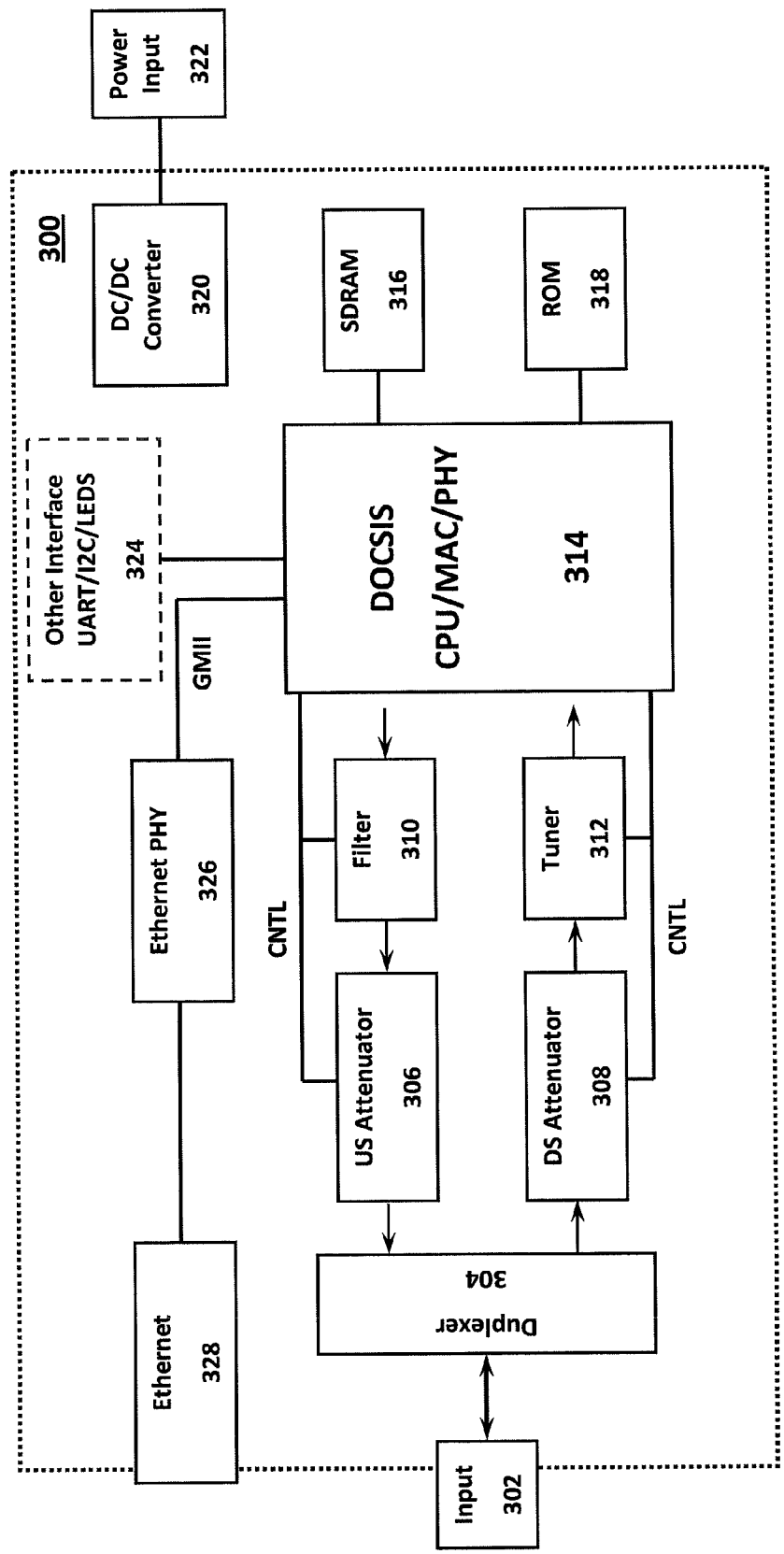
FIGS. 3a-3c are block diagrams illustrating communication between transmitting and receiving access points.

As indicated in FIG. 3a, the DOCSIS modem of the Auto-Attenuation System has two attenuators which may control downstream and upstream attenuation independently. The attenuators may be 0 to 31 dB attenuators with a usable range of about 0 to 20 dB, in 1 dB steps. The downstream and upstream control may run independently in software (e.g., downstream control does not rely on upstream control or vice versa). The attenuators may be controlled by a cable modem (e.g., a Hitron modem) via software commands. Auto-attenuation algorithms are implemented via software command in the modem for controlling the attenuator's levels.

Figure 3B:
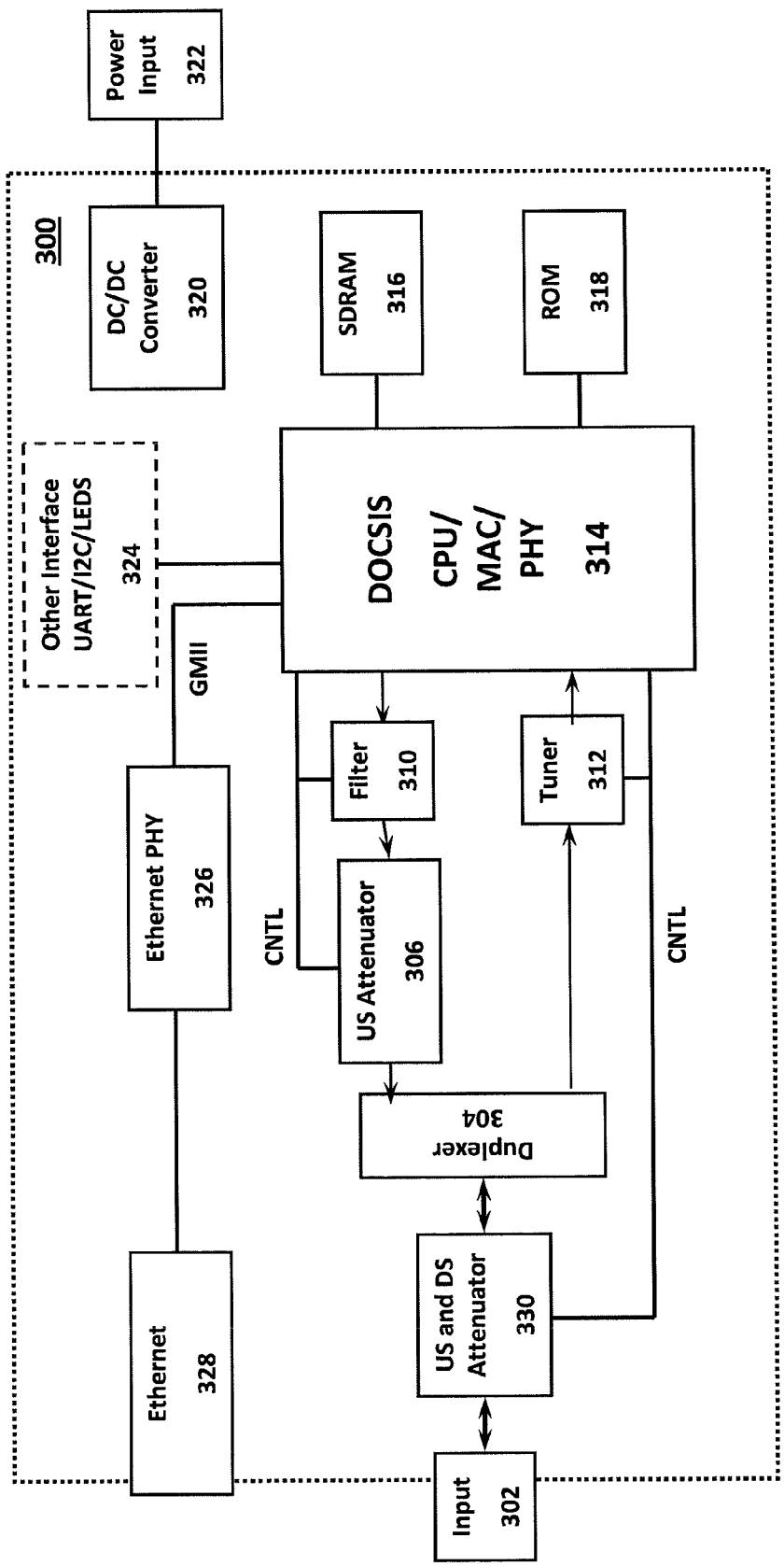
Figure 3C:
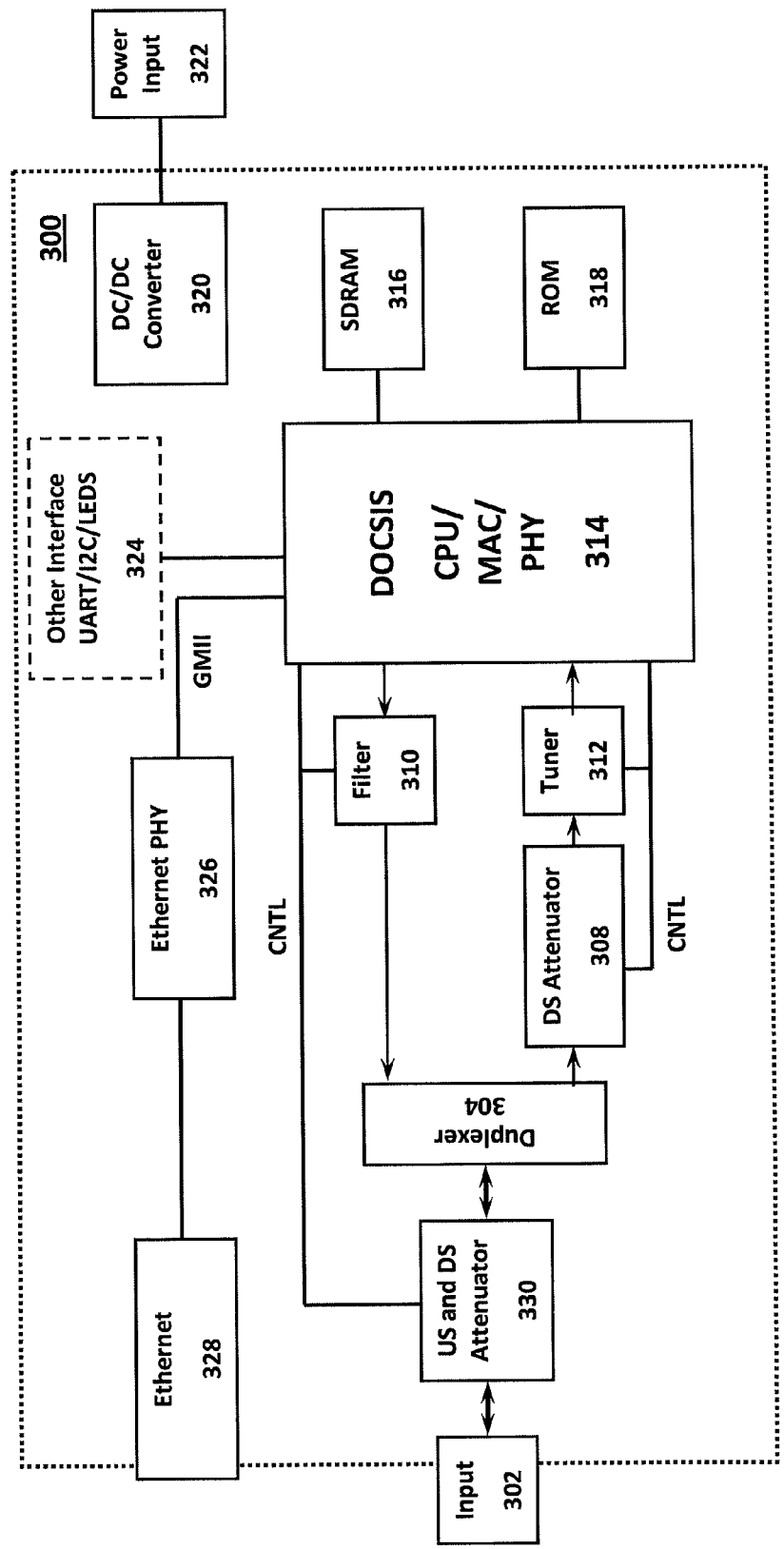

The cable modem system 300 may also include a hard-wired power supply and/or battery at Power Input 322. When a hard-wired supply is used, 120VAC power from the user's home or other source may be reduced and converted to DC using an AC/DC converter (e.g., a typical wall adapter). The DC current may then be connected (e.g., via a plug) at Power Input 322 and increased/decreased as necessary using an DC/DC converter 320. Preferably, the AC power is supplied through the coax cable, and is split from the RF signal at a splitter mounted anywhere between the tap and the cable modem, typically inside the housing which contains the Auto- Attenuation System of FIG. 3a. Each of FIGS. 3b and 3c illustrates a variation of FIG. 3a. In each, a US/DS Attenuator 330 is placed between the input 302 and the duplexer 304. As a result, only a single attenuator (e.g., a single US Attenuator 306 or DS Attenuator 308) may be needed between the duplexer 304 and the CPU 314.

The Auto-Attenuation System may be enabled to measure the power received and automatically adjust the upstream and/or downstream gains to guarantee proper performance (e.g., by keeping the level near a predetermined target range and/or over/under a predetermined threshold, where the range and/or threshold may be automatically or manually adjusted). The Auto-Attenuation System automates adjustments such that a technician need not calibrate the system upon installation and, should adjustments be needed at a later time, the Auto-Attenuation System may automate future adjustments. This application is unique and highly advantageous.

The primary objective of the Auto-Attenuation System algorithm is to monitor downstream and upstream levels to and/or from the cable modem. In doing so, the Auto-Attenuation System algorithm brings downstream and upstream levels into a target range (e.g., target+/−a range window) by adjusting each attenuator. Generally speaking, downstream and upstream attenuator state machines may be run independently; however, they may also run concurrently. The Auto-Attenuation System algorithm may also aim to keep downstream and upstream power levels in the target range by monitoring downstream and upstream levels and adjusting one or both attenuators for Out-Of-Range or Not-Synchronized conditions. In some instances, the Auto-Attenuation System may include a mechanism capable of warning when certain conditions arise (e.g., reaching maximum or minimum attenuator setting, Not-Synchronize, and/or Out-Of-Range). The cable modem may also warn downstream and/or upstream algorithms if the cable modem cannot achieve synchronization because of an attenuator's running out of range (e.g., out of the minimum/maximum attenuation range).

Figure 4A:
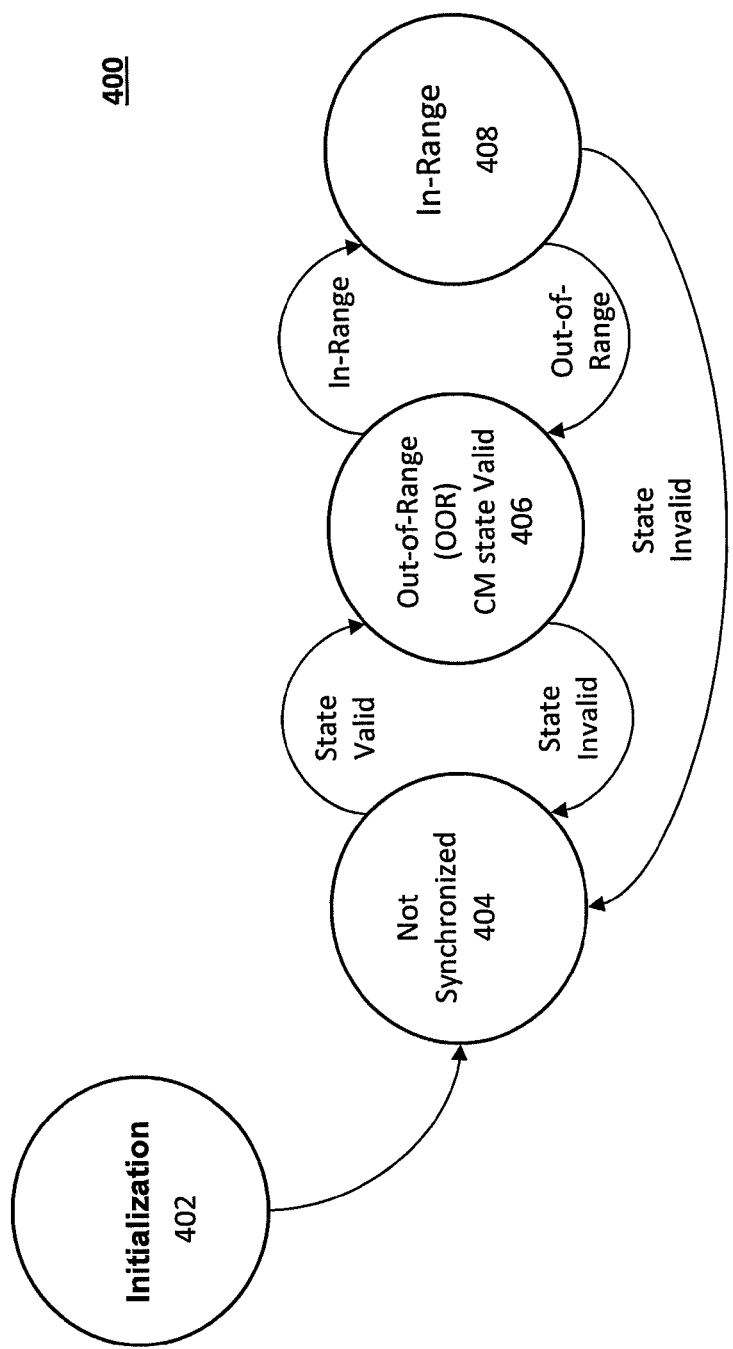
FIGS. 4a-4c are state diagrams illustrating the various cable modem states.

Referring now to FIG. 4a, a basic automatic attenuation algorithm state diagram for a cable modem is shown. Once the modem has been initialized at 402, the system (e.g., a processor in the cable modem) will automatically make a determination based on (i) a target parameter, (ii) the range, and (iii) a connection state between the cable modem and the Cable Modem Termination System (CMTS) indicating whether the cable modem is In-Range at 408, Not-Synchronized at 404, or Out-Of-Range at 406. Assuming that conditions have not changed since the last initialization, a modem initialized at 402 can speed up synchronization time by implementing the last attenuation values. These last attenuation values may be stored in the modem (e.g., in the RAM or ROM). If conditions have changed significantly, however, the modem may need to search between minimum and maximum attenuation on the downstream to achieve synchronization. If conditions have changed significantly on the upstream, the cable modem may use the minimum attenuation setting and rely on large upstream dynamic range to achieve a valid US state.

For example, if the cable modem in operation has not synchronized with the CMTS to enable exchange of data, the cable modem is in the Not-Synchronized 404 state. In the Not-Synchronized 404 state, the cable modem may be able to communicate, but at undesirable levels (e.g., at a low level, −35 dBmv). This situation is not ideal because if there are too many cable modems with a low transmit power, the transmit power is not at full power and thus may be overly attenuated, thus introducing additional broadband noise. Consequently, although it physically functions, this arrangement is far from optimal, because when many modems operate at this level, the noise threshold on the service line is exceeded and signal quality suffers.

If the cable modem is synchronized with the CMTS and exchanging data, the cable modem is considered In-Range (e.g., upstream and downstream levels are in optimal ranges). If the cable modem is synchronized with the CMTS and exchanging data but the upstream and/or downstream levels are out of optimal range (the optimal range ~IL− to IL+, described below), the cable modem is Out-Of-Range 406. This narrower In-Range window/optimal range allows for hysteresis of the cable plant without the risk of falling into the Not-Synchronized state. This is important because the cable plant and/or service line actually "breathes" depending on factors such as the weather and/or temperature. For example, variations of 3, 4, or 5 dB can be seen as the cable plant or service line heats up (e.g., during the day or summer), increasing the synchronization, and as the cable plant in service line cools down (e.g., at night or during colder months), decreasing the synchronization.

Figure 5:
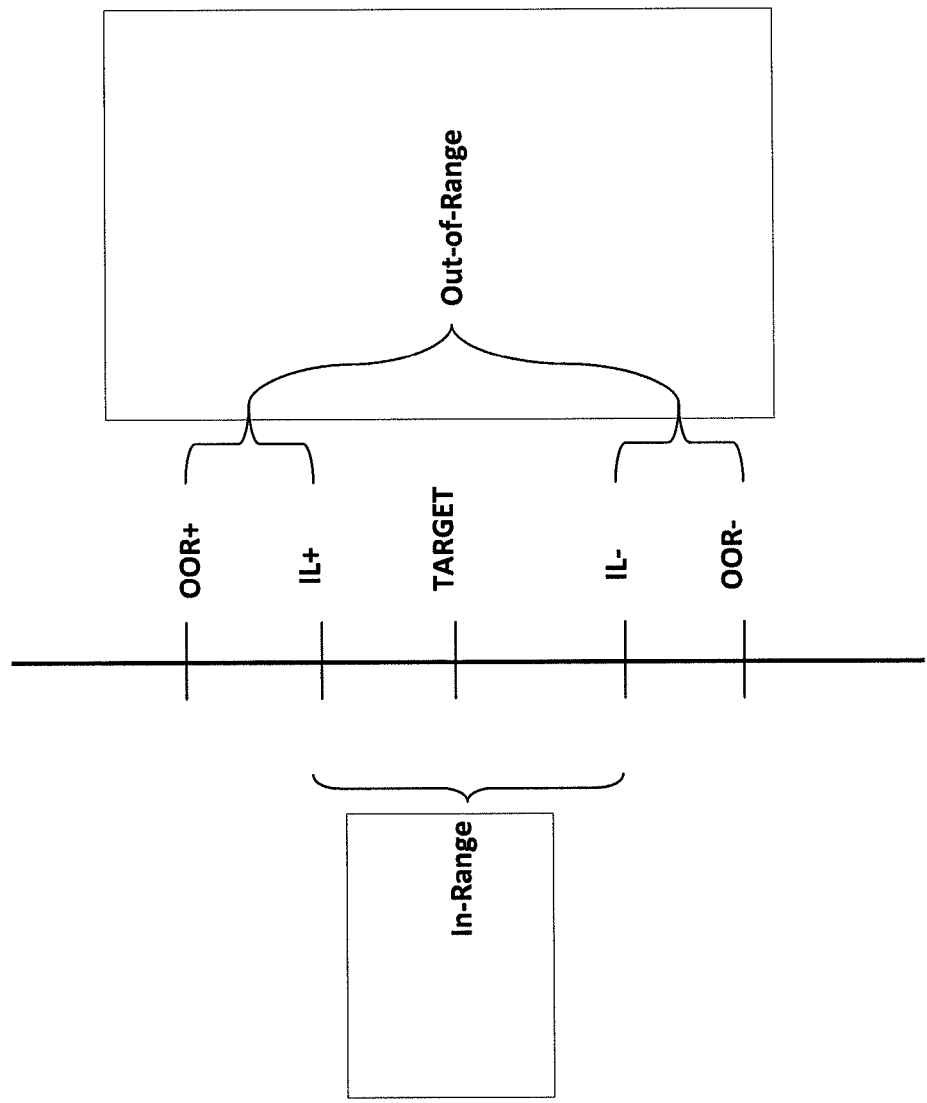
FIG. 5 is a diagram illustrating the target range in relationship to the In-Range and Out-Of-Range states.

FIG. 5 and Table 2 represent the Not-Synchronized, Out-Of-Range, and In-Range states.

TABLE 2

| STATE: | DOWNSTREAM | UPSTREAM |
| --- | --- | --- |
| NOT-SYNCHRONIZED | No Downstream Sync | Ranging/Synchronization Has Not Been Performed. |
| OUT-OF-RANGE | Downstream Is Synchronized | Ranging/Synchronization Has Completed |
| IN-RANGE | IL− < Downstream RF Level < IL+ | IL− < Upstream RF Level < IL+ |

The algorithm allows for a number of settable algorithm parameters. These parameters would typically be set by the cable company depending on their desired signal power and amount of acceptable deviation from the desired signal power (i.e., optimal range/in-range ~IL− to IL+). For example, input parameters to the algorithm may include IL+/− (in-range window), OOR+/− (Out-of-range window—allowing for hysteresis or fluctuation), and the target signal power. But, the target signal power need not necessarily be in the center of the range. These settable algorithm parameters are typically separate values for upstream and downstream signals, but if desired, a user may use the same values for both upstream and downstream signals.

Figure 4B:
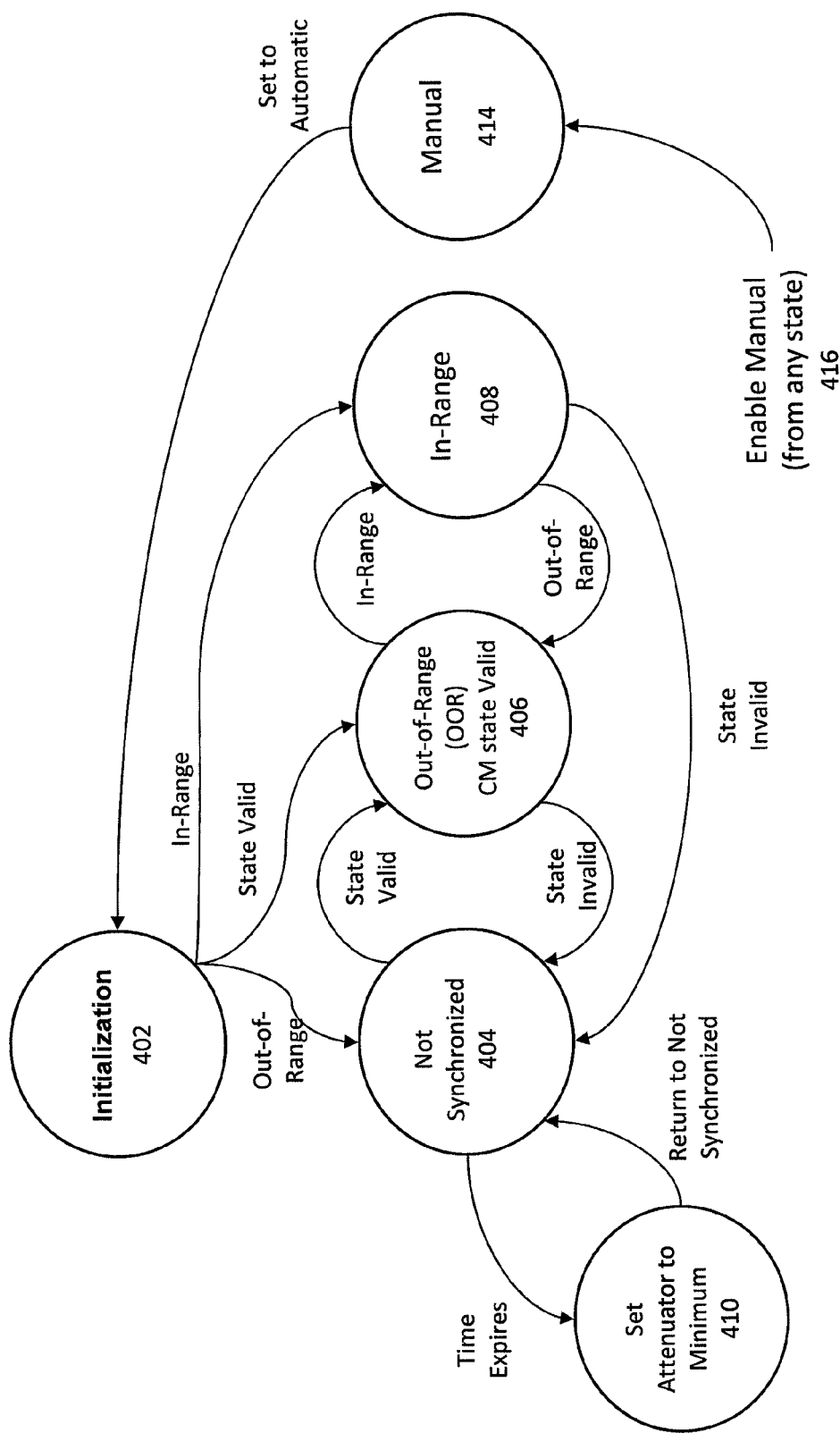
Figure 4C:
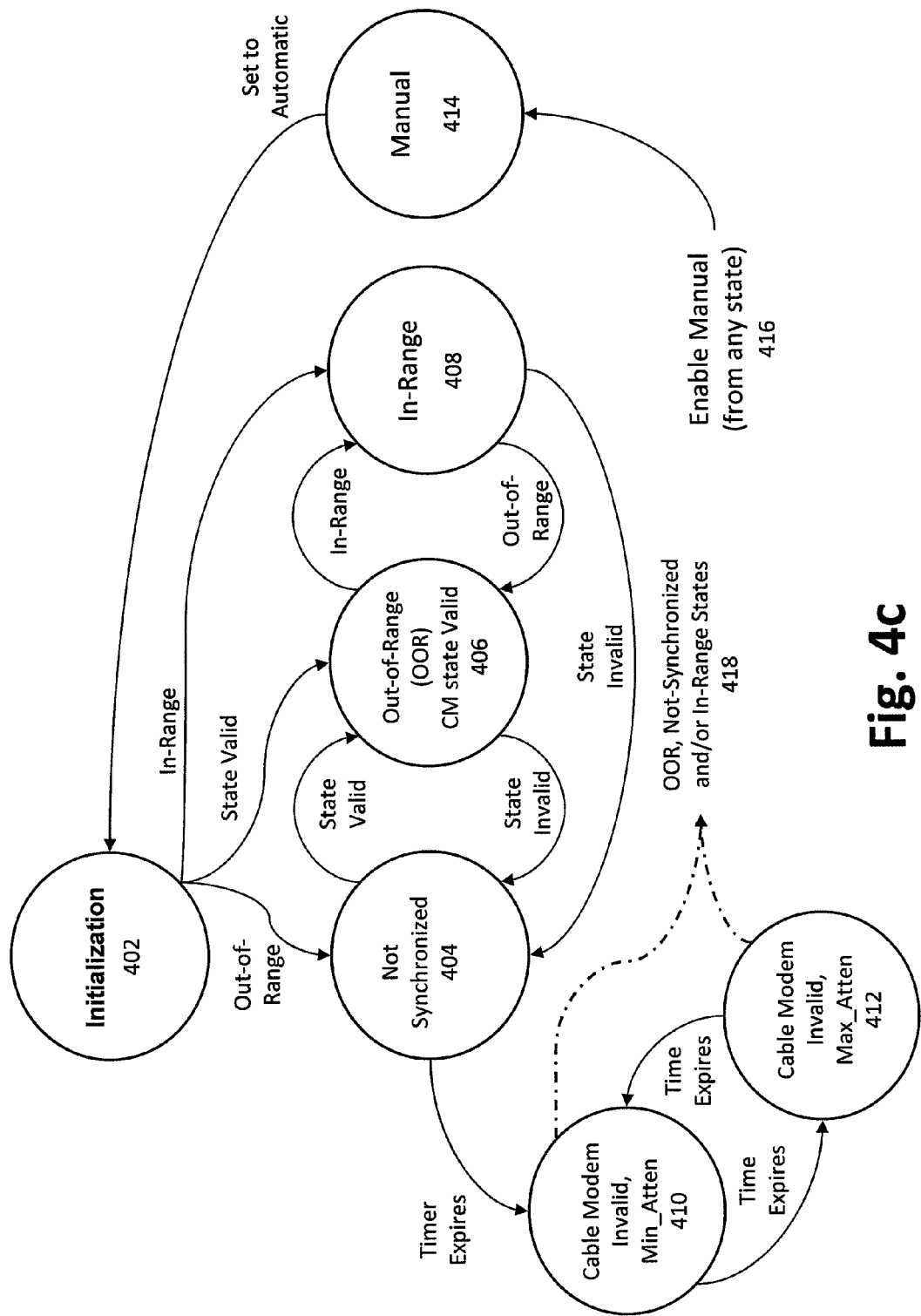

FIGS. 4a through 4c show that the cable modem is capable of changing states based on whether the cable modem is In-Range or Out-Of-Range and valid or invalid. A cable modem has a valid state when it is synchronized with the CMTS; a cable modem has an invalid state when it is not synchronized with the CMTS. A cable modem is In-Range when the algorithm has adjusted the upstream and/or downstream attenuators such that the upstream and/or downstream signals are in optimal range (e.g., between IL− and IL+). Similarly, a cable modem is Out-Of-Range when upstream and/or downstream signals are out of the optimal range (e.g., IL−>signal>IL+). The algorithm generally has input parameters such as the current cable modem state (including any state changes), cable modem downstream and/or upstream power measurements, and target values which are based on parameters set by the cable company. These input parameters are used to yield outputs such as the downstream and/or upstream attenuation setting(s), the downstream and/or upstream algorithm state, and any desired alarms (e.g., when the cable modem is unable to synchronize).

FIG. 4b is a basic automatic attenuation algorithm state diagram for a cable modem of FIG. 4a, and it further includes a manual state. The Auto-Attenuation System algorithm is capable of having two types of control. If the manual setting 414 is enabled, the automatic state machine is disabled and certain attenuation may be applied to both upstream and/or downstream signals as determined by the service technician. The manual state 414 may be enabled regardless of the current state (e.g., whether Not-Synchronized 404, Out-Of-Range 406 and/or In-Range 414). Thus, the manual mode can override the automatic mode when triggered.

The Auto-attenuation System may also be capable of being adjusted or controlled remotely (e.g., in manual mode, or for adjustments to certain parameters). For example, if the cable company determines that the attenuation needs to be adjusted, the cable plant may simply send a signal (e.g., CLI commands) down the cable strand (e.g., via telnet) to a modem processor to trigger a desired attenuation adjustment.

Upon request, the cable company may be able to monitor and view the current measurements at a certain cable modem. An example command window is depicted in Table 3.

TABLE 3

Upon initialization, the DS and US attenuations are manually set, but the US power is out of range.

```

# cd /card/cm-9                              //Command to show details of Cable Modem No. 9

# show attenuation                           //Command to show the current attenuation settings
DS Attenuation:     10 dB (manual)           //Current Downstream (DS) attenuation is 10db
US Attenuation:     12 dB (manual)           //Current Upstream (US) attenuation is 12db
CM state:           operational              //Cable Modem is Operational
DS atten state:     in-range                 //DS state is in-range
US atten state:     out-of-range             //US state is out-of-range !
DS level:           6.9 dBmV                 //Attenuated DS power is 6.9 dBmV
US level:           52.5 dBmV                //Attenuated US power is 52.5 dBmV
# show attenuation parameters                //Shows parameters preset by cable company
                    DS          US
Mode                manual      auto         //Shows currently in Automatic Mode Operation
OOR-:               3           40 dBmV      //Out-of-Range low end has been preset to 3(DS) & 40(US)
OOR+:               14          54 dBmV      //Out-of-Range high end has been preset to 14(DS) & 54(US)
IL-:                5           42 dBmV      //In-Range low end has been preset to 5(DS) & 42(US)
IL+:                11          52 dBmV      //In-Range high end has been preset to 11(DS) & 52(US)
Target:             8           47 dBmV      //Target power has been preset to 8(DS) & 47(US)
```

DS attenuation is manually adjusted to 14dB while US is set to automatic mode.

```
# set attenuation ds 14                      //Command to Manually Set DS to 14dB
# set attenuation us auto                    //Set US to Automatic Mode Operation
# show attenuation                           //Command to show the current attenuation settings
DS Attenuation:     12 dB (manual)           //Current Downstream (DS) attenuation is 12db
US Attenuation:     12 dB (auto)             //Current Upstream (US) attenuation is 12db
CM state:           operational              //Cable Modem is Operational
DS atten state:     in-range                 //DS state is in-range
US atten state:     out-of-range             //US state is out-of-range
DS level:           6.9 dBmV                 //Attenuated DS power is 6.9 dBmV
US level:           52.5 dBmV                //Attenuated US power is 52.5 dBmV
# show attenuation parameters                //Shows parameters preset by cable company
                    DS          US
Mode                manual      auto         //Shows currently in Automatic Mode Operation
OOR-:               3           40 dBmV      //Out-of-Range low end has been preset to 3(DS) & 40(US)
OOR+:               14          54 dBmV      //Out-of-Range high end has been preset to 14(DS) & 54(US)
IL-:                5           42 dBmV      //In-Range low end has been preset to 5(DS) & 42(US)
IL+:                11          52 dBmV      //In-Range high end has been preset to 11(DS) & 52(US)
Target:             8           47 dBmV      //Target power has been preset to 8(DS) & 47(US)
```

After time has elapsed, US attenuation has automatically increased such that the US is now in-range.

```
DS Attenuation:     12 dB (manual)           //Current Downstream (DS) attenuation is 12db
US Attenuation:     13 dB (auto)             //Current Upstream (US) attenuation is 13db
CM state:           operational              //Cable Modem is Operational
DS atten state:     in-range                 //DS state is in-range
US atten state:     in-range                 //US state is in-range
DS level:           6.9 dBmV                 //Attenuated DS power is now 6.9 dBmV
US level:           51.1 dBmV                //Attenuated US power is now 51.1 dBmV

# show attenuation parameters                //Shows parameters preset by cable company
                    DS          US
Mode                manual      auto         //Shows currently in Automatic Mode Operation
OOR-:               3           40 dBmV      //Out-of-Range low end has been preset to 3(DS) & 40(US)
OOR+:               14          54 dBmV      //Out-of-Range high end has been preset to 14(DS) & 54(US)
IL-:                5           42 dBmV      //In-Range low end has been preset to 5(DS) & 42(US)
IL+:                11          52 dBmV      //In-Range high end has been preset to 11(DS) & 52(US)
Target:             8           47 dBmV      //Target power has been preset to 8(DS) & 47(US)
```

Adjustments to the US attenuation may be automatically made to keep the Attenuated US power within the set range until, for instance, it is switched to manual mode.

In certain embodiments, if a cable modem in the state of FIG. 4b is Not-Synchronized 404, and a timer expires (e.g., after a preset number of seconds or attempts to synchronize), the upstream and/or downstream attenuator may be automatically set to a minimum value 410 in an attempt to synchronize with the CMTS. Once the minimum value 410 has been set, the cable modem may return to the Not-Synchronized 404 state and determine whether the cable modem is now synchronized.

As indicated, the algorithm may use one or more timers to trigger certain actions (e.g., ending a loop or changing states). The one or more timers typically have separate values for upstream and downstream signals, but, they may be the same. For example, the algorithm may include three preset timers: Timer 1 (T1) may be set to the wait-time to trigger an Out-Of-Range/synchronized state; Timer 2 (T2) may be set to the wait-time to trigger an In-Range state or state updates; and Timer 3 (T3) may be set to the wait-time to trigger a Not-Synchronized state.

FIG. 4c is a basic automatic attenuation algorithm state diagram for a cable modem of state FIG. 4a, and it further includes a manual state and additional attenuation control. If a cable modem in the state of FIG. 4c is Not-Synchronized 404 and a timer expires (e.g., after a preset number of seconds or attempts to synchronize), the upstream and/or downstream attenuator may, with the use of timers, automatically switch between a minimum value 410 and a maximum value 412, in an attempt to synchronize with the CMTS. From this loop, the cable modem may be able to return to Not-Synchronized 404, Out-Of-Range 406, and/or In-Range 414, based on whether the cable modem is now In-Range, Out-Of-Range, valid, or invalid.

Once the cable modem has established a downstream signal and is receiving data and/or information from the CMTS, the CMTS may send a message to the cable modem to either increase or decrease the power as much as possible in an attempt to establish the upstream signal. If unable to establish the upstream signal, the cable modem will begin switching between the minimum value 410 and the maximum value 412.

Preferably, the algorithm has been designed to allow a connection to a cable plant where the levels are too hot for the cable modem to easily recover. The algorithm initiates by scanning through the cable plant signals, and if it has not found a usable channel within a certain period of time (the period of time may depend upon factors such as hybrid mode, Euro DOCSIS, North American DOCSIS, and/or Japanese DOCSIS), the attenuator will quickly adjust to a higher level (e.g., 20 dB) of attenuation and repeat the scan. Once the cable modem synchronizes, it has established a downstream signal allowing the cable modem to receive data and information from the CMTS. Because the whole system is static, the only things that may change are the cable and transmit powers. Signals between the CMTS and the cable modem adjust the transmit power on the cable modem, allowing the CMTS to receive the target signal level. On a typical cable modem, the CMTS may increase or decrease the upstream levels in dB increments. In certain embodiments, the Auto-Attenuation System algorithm may need to provide a Not-Synchronized search (if, for instance, no downstream channels can be synchronized, the algorithm may need to cycle through some attenuator settings until synchronization is achieved).

On the downstream side, a cable modem may handle a −15 to +15 dBmV input. Therefore, assuming 3 dB minimum insertion loss, the input node at 0 dB attenuation would have a range of −12 to +18 dBmV and, at 20 dB attenuation, a range of +8 to +38 dBmV. Therefore, to detect a downstream signal, the cable modem may need to switch between 0 dB and 20 dB attenuation levels periodically to ensure that synchronization can be achieved. On the upstream side, a cable modem may output +8 to +55 dBmV. Therefore, assuming 3 dB minimum insertion loss at the output node, assuming 0 dB attenuation would yield a range of +5 to +52 dBmV, while 20 dB attenuation would yield −15 to +22 dBmV. Once downstream synchronization has been achieved and ranging is attempted, use of the modem may start with 0 dB attenuation while switching to 20 dB attenuation occasionally in order to obtain valid upstream power measurements. This may only be necessary in the event that the output level required is <+5 dBmV; thus, the cable modem may not need to cycle the upstream attenuator when the upstream status is not valid.

Figure 6:
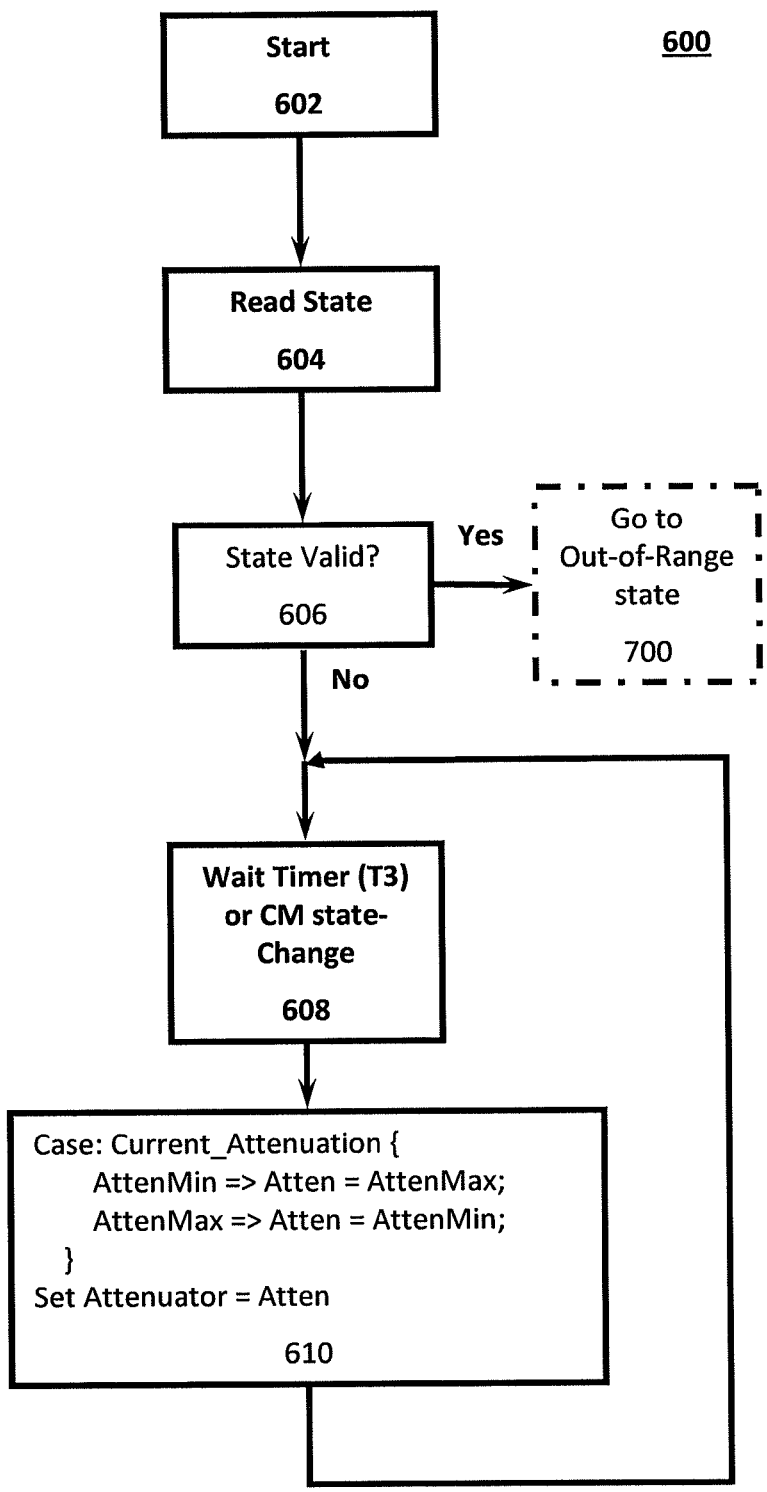
FIG. 6 is a flow diagram of the Not-Synchronized state.

FIG. 6 depicts a flowchart for the Not-Synchronized state 600. The functions in these flowcharts are preferably performed by one or more processors (with the required memory) in the cable modem, but may be performed by structure outside the modem, or a combination of in-modem and outside-modem structures. The cable modem processor(s) starts at 602 by determining the current state 604 (as described above). If the cable modem is synchronized with the CMTS (state valid) at 606, the cable modem changes to an Out-Of-Range state at 700. If the cable modem is not synchronized with the CMTS (state invalid) at 606, the attenuation alternates between minimum and maximum attenuation values at 610 until either the timer (T3) is up or the cable modem changes state at 608.

Figure 7:
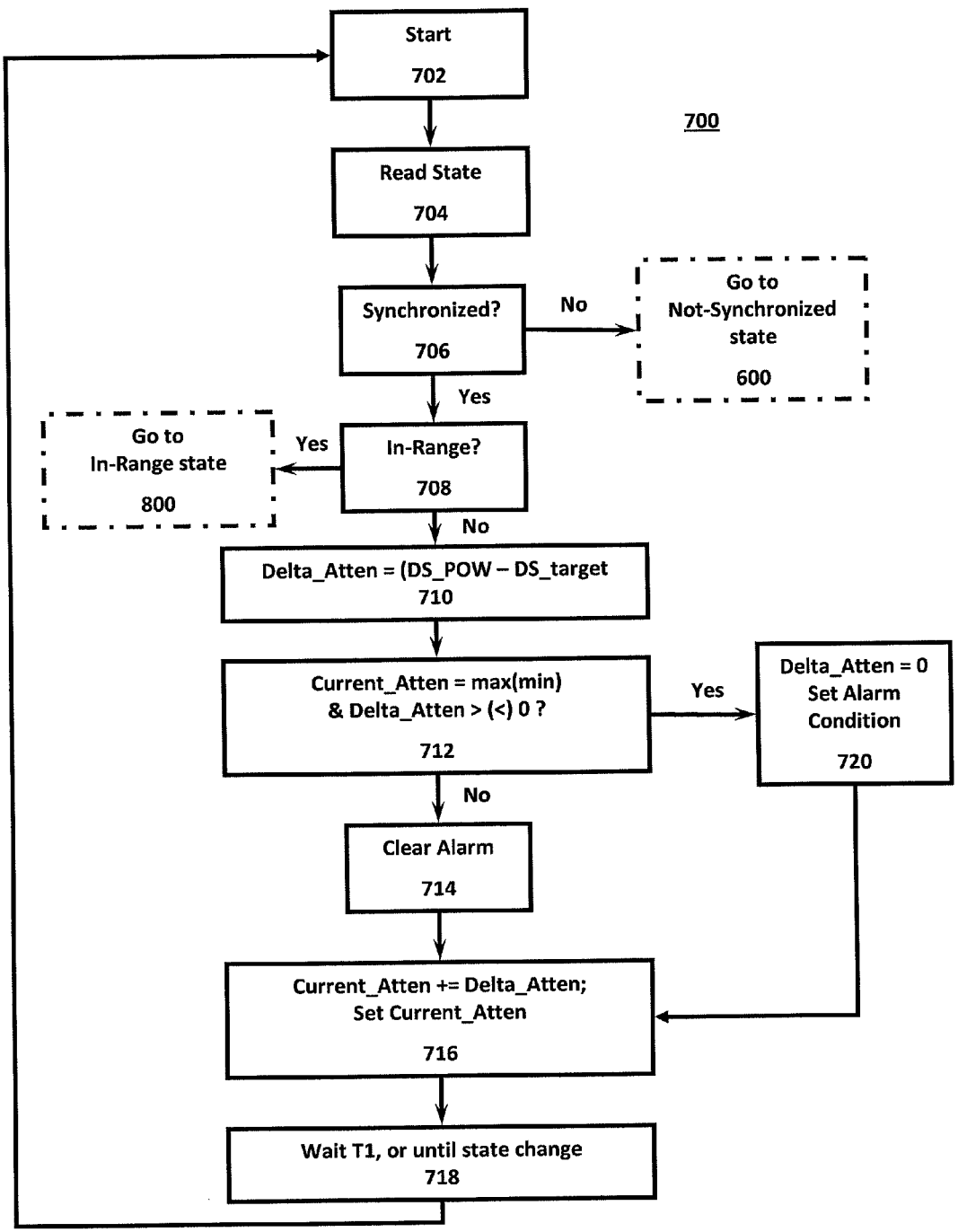
FIG. 7 is a flow diagram of the Out-Of-Range state.

FIG. 7 depicts a flowchart for the Out-Of-Range state 700. The cable modem starts by determining the current state at 704. If the cable modem is not synchronized with the CMTS (state invalid) at 706, the cable modem changes to Not-Synchronized state at 600. If the cable modem is synchronized with the CMTS (state valid) at 706, the cable modem determines whether the upstream and the downstream levels are in optimal range (In-Range) at 708. If the cable modem is In-Range at 708, the cable modem changes to an In-Range state at 800. If the cable modem is not In-Range at 708, the cable modem determines the change in attenuation (delta_attenuation) by subtracting the target value from the current downstream power at 710. If the current attenuation is equal to the maximum (minimum) attenuation and the delta attenuation is more (less) than 0 (at 712), the alarm is raised at 720. Otherwise, the alarm is cleared at 714. Following the alarm action, the attenuation is set to current attenuation plus delta_attenuation at 716. The cable modem starts over at 702 until either the timer (T1) is up or the cable modem changes state at 718.

Figure 8:
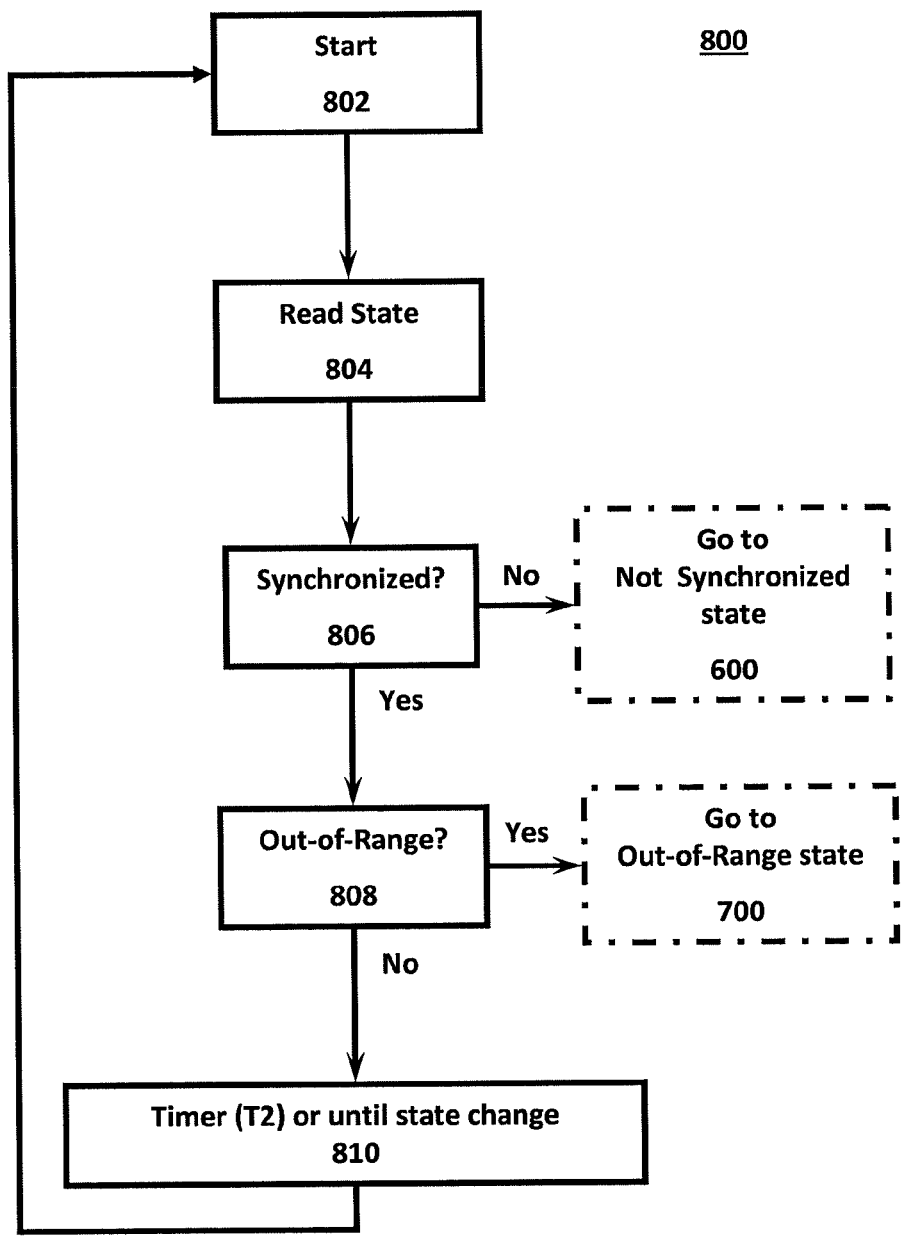
FIG. 8 is a flow diagram of the In-Range state.

FIG. 8 depicts a flowchart for the In-Range state 800. The cable modem starts by determining the current state at 804. If the cable modem is not synchronized with the CMTS (state invalid) at 806, the cable modem changes to a Not-Synchronized state at 600. If the cable modem is synchronized with the CMTS (state valid) at 806, the algorithm determines if the upstream and downstream levels are out of the optimal range (Out-Of-Range) at 808. If the cable modem is Out-Of-Range at 808, the cable modem changes to an Out-Of-Range state at 700. If the cable modem is not Out-Of-Range at 808 (i.e., In-Range), the cable modem starts over at 802 until either the timer (T2) is up or the cable modem changes state at 810.

As indicated in FIGS. 6 through 8, the cable modem may alarm downstream and/or upstream algorithms if the cable modem cannot achieve synchronization because of an attenuator's running out of range (e.g., out of the minimum and maximum attenuation range).

Thus, what has been described are presently preferred embodiments of an invention for providing easy and effective of attenuation of signals supplied to a modem. While the description so far has centered on coaxial cabling, it is clear to those of skill in the art that it can equally be applied to other cabling systems including, for example, balanced differential twisted pairs.

The above-cited patents and patent publications are hereby incorporated by reference in their entirety herein, because they provide additional background information which may be considered relevant to the present application. Although various embodiments have been described with reference to a particular arrangement of parts, features, and the like, these are not intended to exhaust all possible arrangements or features, and indeed many other embodiments, modifications and variations will be ascertainable to those of skill in the art. Thus, it is to be understood that the invention may therefore be practiced otherwise than as specifically described above.

What is claimed is:

1. A device for attenuating an input signal, comprising:
   a duplexer for splitting the input signal into an upstream signal and a downstream signal;
   an upstream attenuator, configured to attenuate said upstream signal independently of said downstream signal; and
   at least one control processor configured to:
      determine that a cable modem is not synchronized with a Cable Modem Termination System (CMTS) when the upstream signal level is not within a first range for the upstream signal;
      adjust the upstream attenuator until the upstream signal level is within the first range, to synchronize the cable modem with the CMTS; and
      when the cable modem is synchronized with the CMTS, adjust the upstream attenuator until the upstream signal level is within a second range for the upstream signal, narrower than the first range;
      wherein to adjust the upstream attenuator until the upstream signal is within a second range, the at least one control processor is further configured to adjust a current attenuation of the upstream attenuator based on a target value for the upstream signal.

2. The device of claim 1, wherein to adjust the upstream attenuator until the upstream signal level is within the first range, the at least one control processor is further configured to adjust the upstream attenuator to one of a minimum and a maximum upstream attenuation value.

3. The device according to claim 1, wherein to adjust the upstream attenuator until the upstream signal is within the first range, the at least one control processor is further configured to adjust the upstream attenuator by alternating the upstream attenuation between a minimum and a maximum value.

4. The device according to claim 1, further comprising a downstream attenuator configured to attenuate the downstream signal independently of the upstream signal, and wherein the at least one control processor is further configured to:
   determine that the cable modem is not synchronized with the CMTS when the downstream signal level is not within a first range for the downstream signal;
   adjust the downstream attenuator until the downstream signal level is within the first range, to synchronize the cable modem with the CMTS; and
   when the cable modem is synchronized with the CMTS, adjust the downstream attenuator until the downstream signal level is within a second range for the downstream signal, narrower than the first range.

5. The device of claim 4, wherein to adjust the downstream attenuator until the downstream signal is within the first range for the downstream signal, the at least one control processor is further configured to adjust the downstream attenuator to one of a minimum and a maximum downstream attenuation value.

6. The device of claim 4, wherein to adjust the downstream attenuator until the downstream signal is within the first range for the downstream signal, the at least one control processor is further configured to adjust the downstream attenuator by alternating the downstream attenuation between a minimum and a maximum value.

7. The device of claim 4, wherein to adjust the downstream attenuator until the downstream signal is within the second range for the downstream signal, the at least one control processor is further configured to adjust a current attenuation of the downstream attenuator based on a target value for the downstream signal.

8. The device of claim 4, wherein the first and second ranges for the upstream signal are respectively different from the first and second ranges for the downstream signal.

9. The device of claim 4, wherein the at least one control processor is configured to adjust the downstream attenuator to minimize a receive error rate (BER or CER).

10. The device of claim 1, wherein the at least one control processor is configured to receive independent upstream level control requests from the CMTS.

11. The device of claim 1, wherein the at least one control processor is configured to adjust the upstream attenuator to enable the cable modem to operate at a maximum Signal-to-Noise Ratio (SNR).

12. The device of claim 1, wherein the device is integrated in the cable modem.

13. The device of claim 1, wherein the cable modem is integrated in a strand-mounted wireless access point comprising an access radio coupled to an access antenna.

14. A method for a device for attenuating an input signal comprising:
   splitting the input signal into an upstream signal and a downstream signal;
   determining that a cable modem is not synchronized with a Cable Modem Termination System (CMTS) when the upstream signal level is not within a first range for the upstream signal;
   adjusting an upstream attenuator configured to attenuate the upstream signal independently of said downstream signal, until the upstream signal level is within the first range, to synchronize the cable modem with the CMTS; and
   when the cable modem is synchronized with the CMTS, adjusting the upstream attenuator until the upstream signal level is within a second range for the upstream signal, narrower than the first range;
   wherein to adjust the upstream attenuator until the upstream signal is within a second range for the upstream signal, the method further comprises adjusting a current attenuation of the upstream attenuator based on a target value for the upstream signal.

15. The method of claim 14, wherein to adjust the upstream attenuator until the upstream signal level is within the first range, the method further comprises adjusting the upstream attenuator to one of a minimum and a maximum upstream attenuation value.

16. The method of claim 14, wherein to adjust the upstream attenuator until the upstream signal is within the first range, the method further comprises adjusting upstream attenuator by alternating the upstream attenuation between a minimum and a maximum value.

17. The method of claim 14, further comprising:
determining that the cable modem is not synchronized with the CMTS when the downstream signal level is not within a first range for the downstream signal;
adjust a downstream attenuator configured to attenuate the downstream signal independently of the upstream signal, until the downstream signal level is within the first range, to synchronize the cable modem with the CMTS; and
when the cable modem is synchronized with the CMTS, adjust the downstream attenuator until the downstream signal level is within a second range for the downstream signal, narrower than the first range.

18. The method of claim 17, wherein to adjust the downstream attenuator until the downstream signal is within the first range for the downstream signal, the method further comprises adjusting the downstream attenuator to one of a minimum and a maximum downstream attenuation value.

19. The method of claim 17, wherein to adjust the downstream attenuator until the downstream signal is within the first range for the downstream signal, the method further comprises adjusting the downstream attenuator by alternating the downstream attenuation between a minimum and a maximum value.

20. The method of claim 17, wherein to adjust the downstream attenuator until the downstream signal is within the second range for the downstream signal, the method further comprises adjusting a current attenuation of the downstream attenuator based on a target value for the downstream signal.

21. The method of claim 17, wherein the first and second ranges for the upstream signal are respectively different from the first and second ranges for the downstream signal.

22. The method of claim 17, wherein adjusting the downstream attenuator is to minimize a receive error rate (BER or CER).

23. The method of claim 14, further comprising receiving independent upstream level control requests from the CMTS.

24. The method of claim 14, wherein adjusting the upstream attenuator is to enable the cable modem to operate at a maximum Signal-to-Noise Ratio (SNR).

25. The method of claim 14, wherein the device is integrated in the cable modem.

26. The method of claim 14, wherein the cable modem is integrated in a strand-mounted wireless access point comprising an access radio coupled to an access antenna.

* * * * *